US008364871B2

(12) United States Patent
Brownlow et al.

(10) Patent No.: US 8,364,871 B2
(45) Date of Patent: Jan. 29, 2013

(54) PROVIDING VIRTUAL FUNCTIONS AFTER AN INPUT/OUTPUT ADAPTER IS MOVED FROM A FIRST LOCATION TO A SECOND LOCATION

(75) Inventors: Sean T. Brownlow, Rochester, MN (US); Bryan M. Logan, Rochester, MN (US); Gregory M. Nordstrom, Pine Island, MN (US); John R. Oberly, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 13/013,460

(22) Filed: Jan. 25, 2011

(65) Prior Publication Data
US 2012/0191884 A1 Jul. 26, 2012

(51) Int. Cl.
G06F 3/00 (2006.01)
G06F 13/12 (2006.01)
(52) U.S. Cl. ................. 710/64; 710/8; 710/62
(58) Field of Classification Search ........... 710/8, 62, 710/64
See application file for complete search history.

(56) References Cited

U.S. PATENT DOCUMENTS

| 2007/0109150 A1* | 5/2007 | Gershfeld et al. ............. 341/22 |
| 2009/0144731 A1* | 6/2009 | Brown et al. ..................... 718/1 |
| 2009/0193166 A1* | 7/2009 | Kropp et al. .................. 710/110 |
| 2009/0248937 A1 | 10/2009 | Solomon et al. |
| 2009/0276773 A1 | 11/2009 | Brown et al. |
| 2009/0313391 A1 | 12/2009 | Watanabe |
| 2010/0014526 A1 | 1/2010 | Chavan et al. |
| 2010/0082874 A1 | 4/2010 | Baba et al. |
| 2010/0095310 A1 | 4/2010 | Oshins |
| 2010/0180274 A1 | 7/2010 | Cherian et al. |
| 2012/0102490 A1* | 4/2012 | Eide et al. ......................... 718/1 |

* cited by examiner

Primary Examiner — Chun-Kuan Lee
Assistant Examiner — David Martinez
(74) Attorney, Agent, or Firm — Toler Law Group

(57) ABSTRACT

A computer implemented method includes identifying a hardware input/output adapter in a first physical slot location. The computer implemented method includes determining that the hardware input/output adapter is capable of hosting a plurality of virtual functions in the first physical slot location. The computer implemented method also includes selecting a group identifier that is unassociated with another physical slot location. The computer implemented method includes associating the group identifier with the first physical slot location of the hardware input/output adapter.

20 Claims, 9 Drawing Sheets

PROVIDING VIRTUAL FUNCTIONS AFTER AN INPUT/OUTPUT ADAPTER IS MOVED FROM A FIRST LOCATION TO A SECOND LOCATION

I. FIELD OF THE DISCLOSURE

The present disclosure relates generally to computer systems, and more particularly, to managing virtual functions that are hosted by a virtualized input/output (I/O) adapter.

II. BACKGROUND

A logically-partitioned computer system may include a virtualized hardware input/output (I/O) adapter. The virtualized hardware I/O adapter may be configured to provide multiple virtual functions to multiple logical partitions.

SUMMARY

In a particular embodiment, a computer implemented method includes identifying a hardware input/output adapter in a first physical slot location. The computer implemented method includes determining that the hardware input/output adapter is capable of hosting a plurality of virtual functions in the first physical slot location. The computer implemented method also includes selecting a group identifier that is unassociated with another physical slot location. The computer implemented method includes associating the group identifier with the first physical slot location of the hardware input/output adapter.

In another particular embodiment, an apparatus includes a processor and a memory to store program code. The program code may be executable by the processor to identify a hardware input/output adapter in a first physical slot location. The program code may be executable by the processor to determine that the hardware input/output adapter is capable of hosting a plurality of virtual functions in the first physical slot location. The program code may be further executable by the processor to select a group identifier that is unassociated with another physical slot location. The program code may be executable by the processor to associate the group identifier with the first physical slot location of the hardware input/output adapter.

In another particular embodiment, a computer program product includes a non-transitory computer usable medium having computer usable program code embodied therewith. The computer usable program code may be executable by a processor to identify a hardware input/output adapter in a first physical slot location. The computer usable program code may be executable by the processor to determine that the hardware input/output adapter is capable of hosting a plurality of virtual functions in the first physical slot location. The computer usable program code may be executable by the processor to select a group identifier that is unassociated with another physical slot location. The computer usable program code may be executable by the processor to associate the group identifier with the first physical slot location of the hardware input/output adapter.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

III. BRIEF DESCRIPTION OF THE DRAWINGS

IV. DETAILED DESCRIPTION

Figure 1:
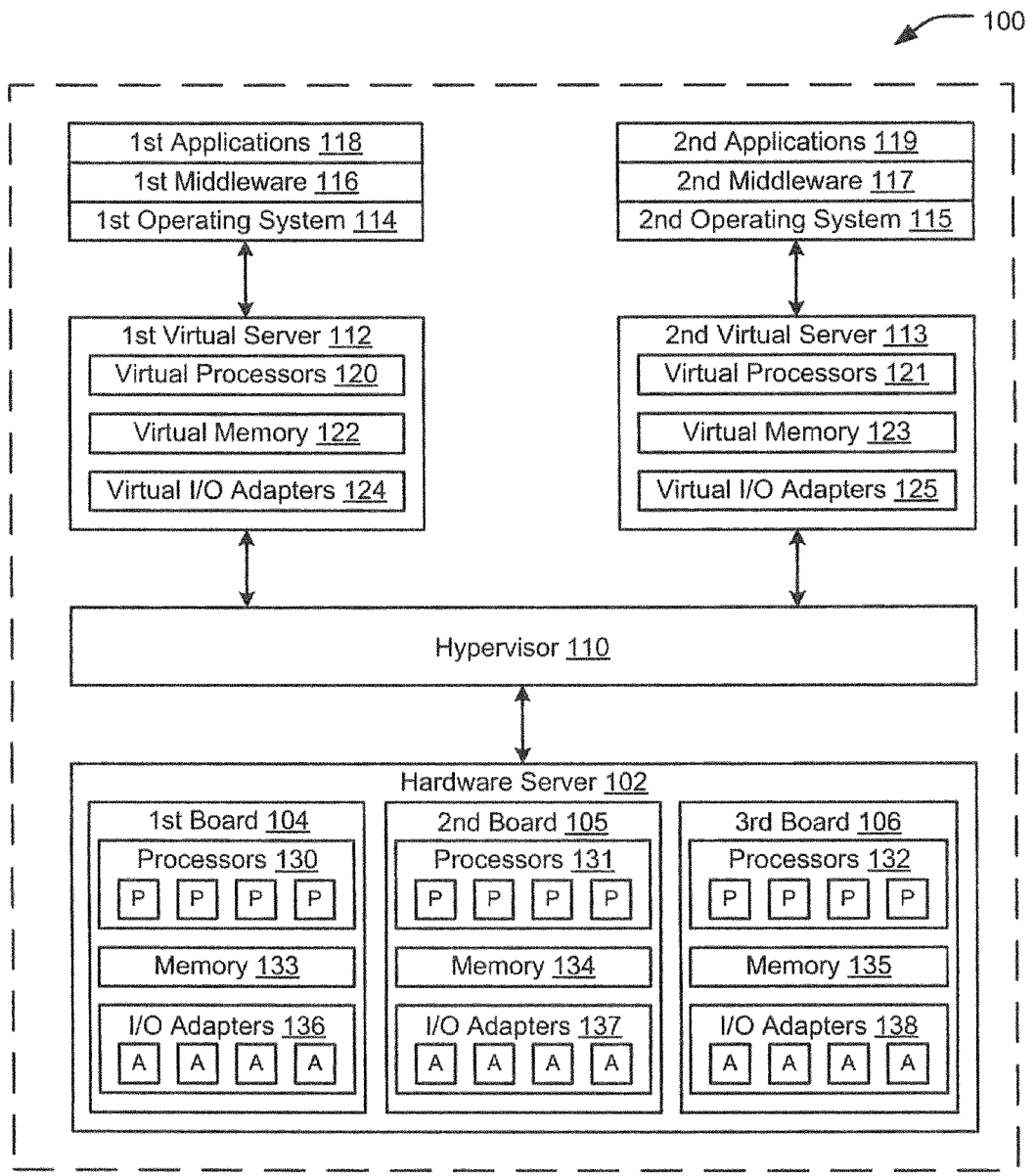
FIG. 1 is a block diagram of a first embodiment of a system to provide virtual functions that are hosted by an input/output adapter.

In a virtualized computer system, a hardware input/output (I/O) adapter may be capable of providing virtual functions to multiple logical partitions. In certain circumstances, the hardware I/O adapter may be moved from a first physical slot location to a second physical slot location. For example, the hardware I/O adapter may be moved because the second physical slot location may enable the hardware I/O adapter to provide more virtual functions as compared to the first physical slot location. To illustrate, the second physical slot location may have more data lanes (e.g., to enable higher throughput) than the first physical slot location. If the hardware I/O adapter is plugged into the second physical slot location, the hardware I/O adapter may be capable of hosting more virtual functions as compared to when the hardware I/O adapter is plugged into the first physical slot.

Moving the hardware I/O adapter may cause the hardware I/O adapter to be reconfigured in the second physical slot location to provide the virtual functions. Reconfiguring the hardware I/O adapter after moving the hardware I/O adapter from the first physical slot location to the second physical slot location may be time consuming, and may include a system administrator manually interacting with the system. The manual interaction may result in errors. For example, after the hardware I/O adapter is moved to the second physical slot location, the configuration and assignment of virtual functions to logical partitions may not accurately duplicate the original configuration and virtual function assignments because of the manual interactions. During the time that the hardware I/O adapter is being reconfigured to provide the virtual functions, at least some of the logical partitions may be unable to perform I/O operations. For example, a logical partition that was using a virtual function of the hardware I/O adapter when the hardware I/O adapter was in the first physical slot location may be unable to perform I/O operations until the hardware I/O adapter is moved to the second physical slot location and reconfigured to provide the virtual function.

One way to reduce the time to provide virtual functions when a hardware I/O adapter is moved from a first physical slot location to a second physical slot location may be to abstract the physical slot location. For example, virtual functions that are hosted by a hardware I/O adapter in a first physical slot location may be grouped together by associating a group identifier with the first physical slot location of the hardware I/O adapter. If a virtual function is assigned to a logical partition, the logical partition may be provided with a token to access the virtual function. The token may include the group identifier to identify the first physical slot location of the hardware I/O adapter. The token may also include a virtual function identifier to identify the particular virtual function from the multiple virtual functions that are hosted by the hardware I/O adapter.

After the hardware I/O adapter is moved from the first physical slot location to a second physical slot location, the group identifier may be associated with the second physical slot location of the hardware I/O adapter. After the group identifier is associated with the second physical slot location of the hardware I/O adapter, the virtual functions may be enabled. The logical partitions may resume accessing the virtual functions via the previously provided tokens. Thus, the time taken to enable the virtual functions to be accessed after the hardware I/O adapter has been moved to a different physical slot location may be reduced.

Referring to FIG. 1, a block diagram of a first embodiment of a system to provide virtual functions that are hosted by an input/output adapter is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and input/output (I/O) adapters 136-138. Each of the boards 104-106 may include additional hardware resources (not shown), such as specialized processors (e.g., digital signal processors, graphics processors, etc.), disk drives, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121; the memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may assign the virtual I/O adapter 124 to the first virtual server 112. The hypervisor 110 may provide the first virtual server 112 a token (not shown) to enable the first virtual server 112 to access the virtual I/O adapters 124. The token may include a group identifier that identifies a physical slot location of one of the I/O adapters 136-137 that hosts the virtual I/O adapters 124. One of the I/O adapters 136-137 that hosts the virtual I/O adapters 124 may be moved from a first physical slot location to a second physical slot location. After the move, the hypervisor 110 may associate the group identifier with the second physical slot location to enable the virtual I/O adapters 124 to be provided to the first virtual server 112.

Figure 2:
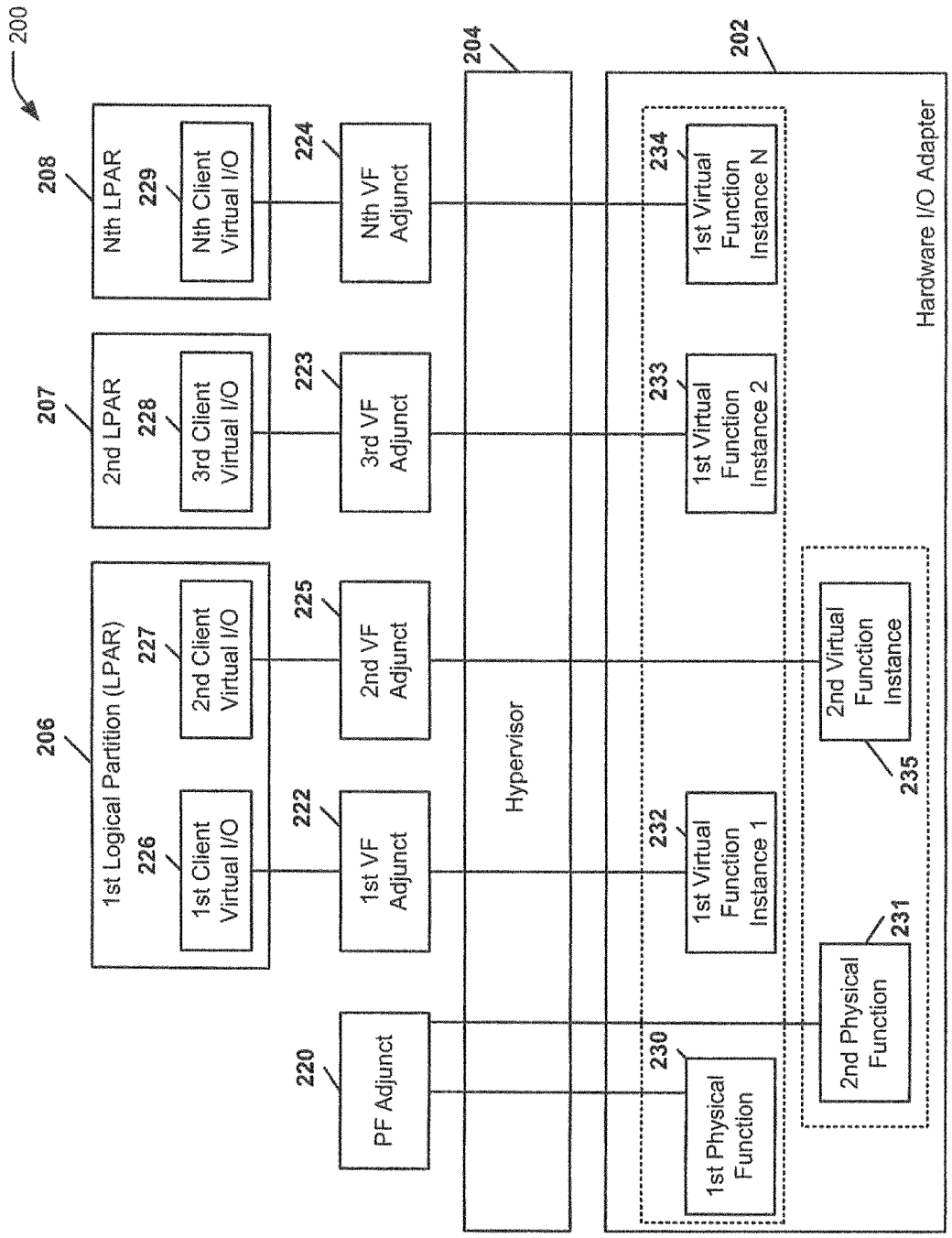
FIG. 2 is a block diagram of a second embodiment of a system to provide virtual functions that are hosted by an input/output adapter.

Referring to FIG. 2, a block diagram of a second embodiment of a system to provide virtual functions that are hosted by an input/output adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/0 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

Thus, the hypervisor 204 may assign the first instance of the first virtual function 232 and the first instance of the second virtual function 235 to the first logical partition 206. The hypervisor 204 may provide the first logical partition 206 with two tokens (not shown), such as a first token and a second token, to enable the first logical partition 206 to access the virtual functions 232 and 235. The token may include a group identifier that is associated by the hypervisor with a physical slot location of the hardware I/O adapter 202 that hosts the virtual functions 232 and 235. The hardware I/O adapter 202 that hosts the virtual functions 232 and 235 may be moved from a first physical slot location to a second physical slot location. After the move, the hypervisor 202 may associate the group identifier with the second physical slot location to enable the virtual functions 232 and 235 to be provided to the first logical partition 206.

It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
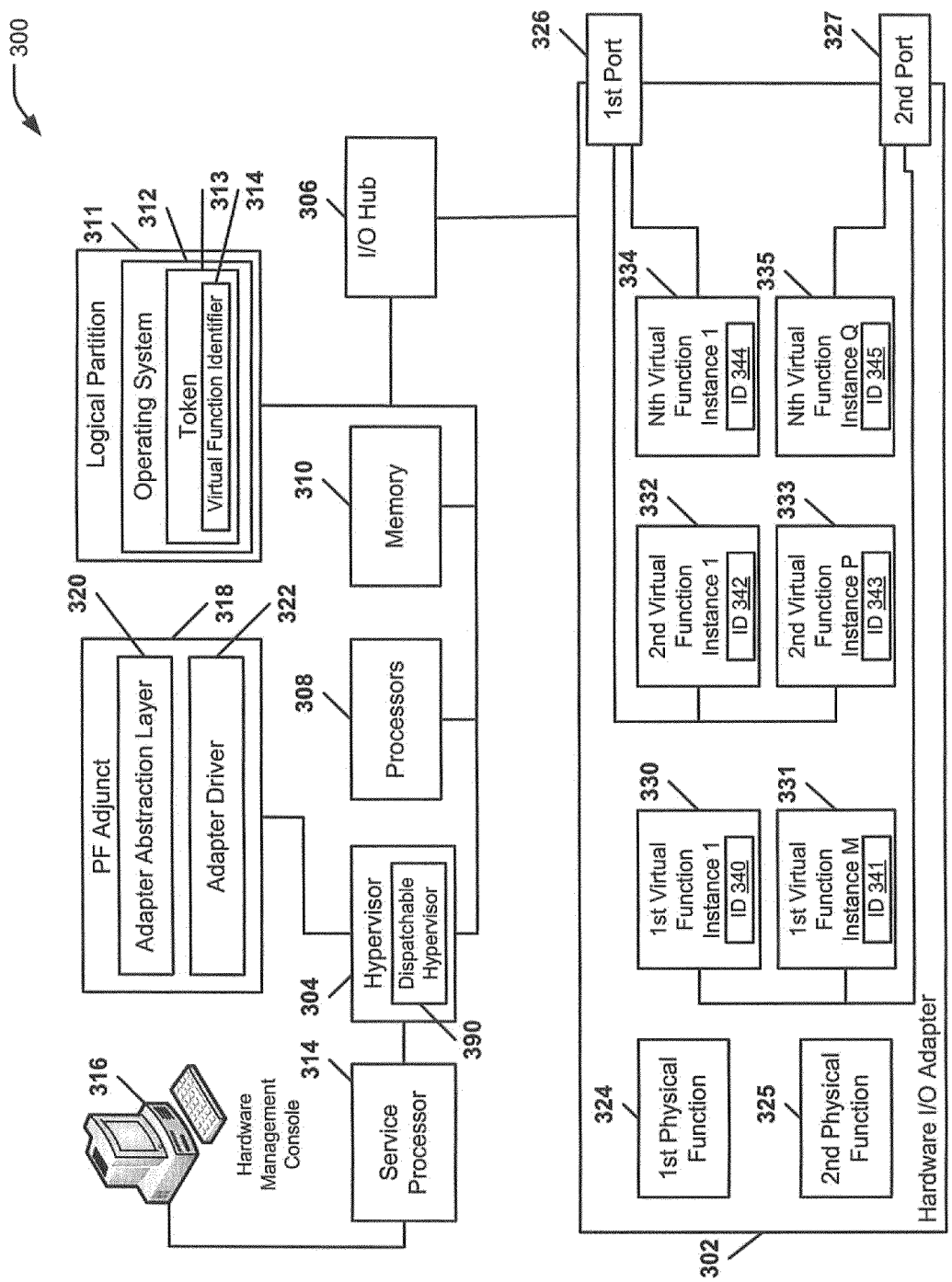
FIG. 3 is a block diagram of a third embodiment of a system to provide virtual functions that are hosted by an input/output adapter.

Referring to FIG. 3, a block diagram of a third embodiment of a system to provide virtual functions that are hosted by an input/output adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports to connect to external devices, for example ports to connect to Ethernet or Fiber Channel devices, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

Each virtual function (e.g., each of the virtual functions 330-335) may have an associated virtual function identifier (ID). For example, in the system 300, the first instance of the first virtual function 330 may have an associated identifier 340, the Mth instance of the first virtual function 331 may have an associated identifier 341, the first instance of the second virtual function 332 may have an associated identifier 342, the Pth instance of the second virtual function 333 may have an associated identifier 343, the first instance of the Nth virtual function 334 may have an associated identifier 3454, and the Qth instance of the Nth virtual function 335 may have an associated identifier 345.

Each virtual function identifier may uniquely identify a particular virtual function that is hosted by the hardware I/O adapter 302. For example, when a message (not shown) is routed to a particular virtual function, the message may include the identifier associated with the particular virtual function. As another example, a token 313 may be provided to the operating system 312 to enable the operating system 312 to access one of the virtual functions 330-335 at the hardware I/O adapter 302. The token 313 may include a virtual function identifier 380 that is associated with the accessed virtual function. For example, the first instance of the first virtual function 330 may be assigned to the operating system 312. The token 313 may be provided to the operating system 312 to access the first instance of the first virtual function 330. The token 313 may include the virtual function identifier 380. The virtual function identifier 380 may comprise the identifier 340 that is associated with the first instance of the first virtual function 330.

Thus, the hypervisor 304 may assign one or more of the virtual functions 330-335 to the logical partition 311. For each virtual function that is assigned to the logical partition 311, the hypervisor 304 may provide the logical partition 206 with a token (not shown) to enable the logical partition 311 to access the virtual function. The token may include a group identifier that the hypervisor associates with a physical slot location of the hardware I/O adapter 302 that hosts the assigned virtual functions. After the hardware I/O adapter 302 is moved from a first physical slot location to a second physical slot location, the hypervisor 302 may associate the group identifier with the second physical slot location to enable one or more of the virtual functions 330-335 to be provided to the logical partition 311.

Figure 4:
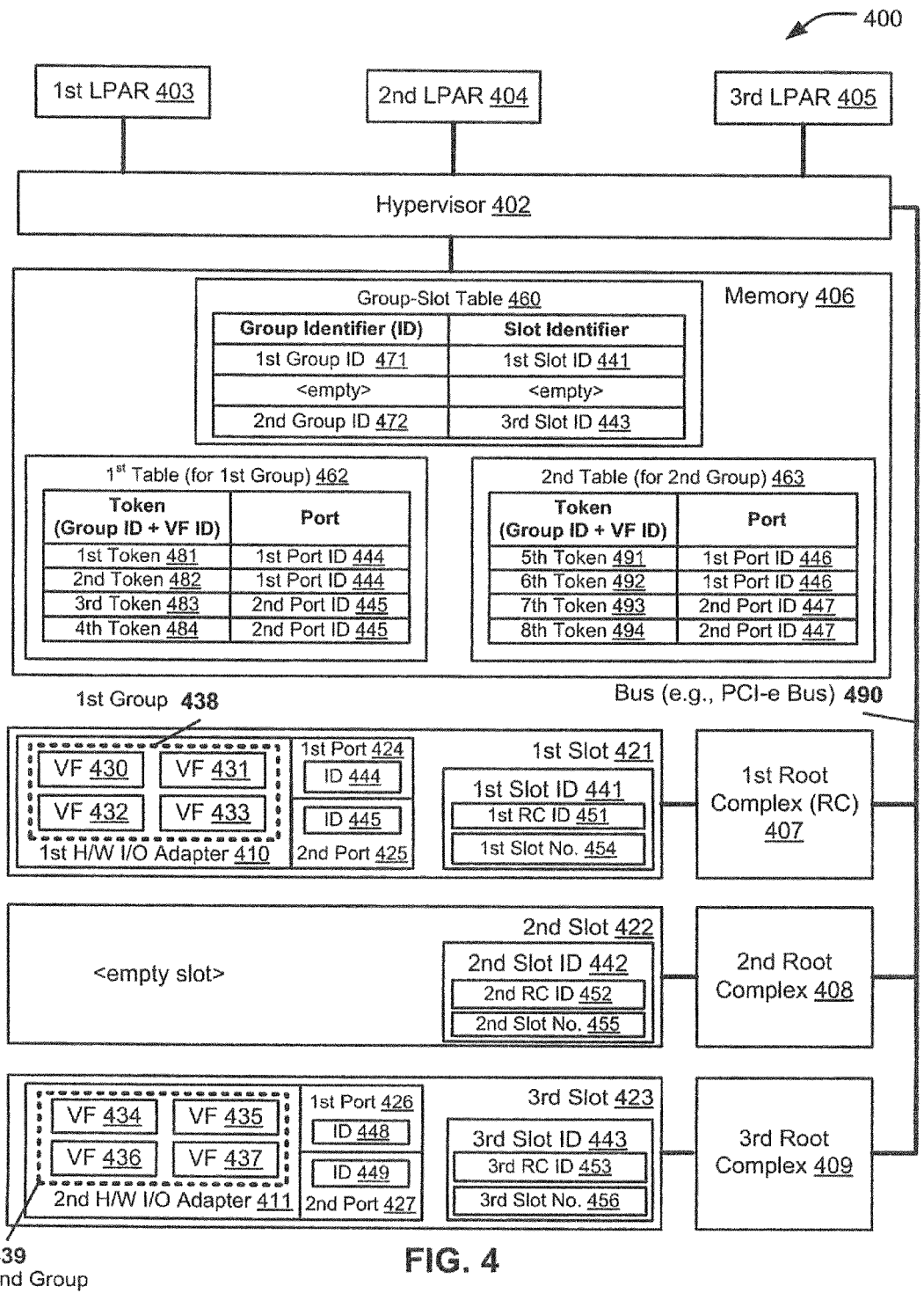
FIG. 4 is a block diagram of a fourth embodiment of a system to provide virtual functions that are hosted by an input/output adapter.

Referring to FIG. 4, a block diagram of a fourth embodiment of a system to provide virtual functions that are hosted by an input/output (I/O) adapter is depicted and generally designated 400.

The system 400 includes a hypervisor 402 that manages multiple logical partitions, such as a first logical partition 403, a second logical partition 404, and a third logical partition 405. The hypervisor 402 may be coupled to various devices, such as a memory 406, a first root complex 407, a second root complex 408, and a third root complex 409. In a particular embodiment, one or more of the root complexes 407-409 may comprise a peripheral component interconnect (PCI) host bridge (PHB).

Each of the root complexes may be coupled to one or more physical location slots. For example, the first root complex 407 may be coupled to a first slot 421, the second root complex 408 may be coupled to a second slot 422, and the third root complex 409 may be coupled to a third slot 423. Each of the slots 421-423 may be physical locations into which a PCI or PCI express (PCI-e) device, such as a hardware I/O adapter, may be placed. In the system 400, a first hardware (H/W) I/O adapter 410 may be placed in the first slot 421. The first hardware I/O adapter 410 may be capable of hosting multiple virtual functions and providing the multiple virtual functions to logical partitions, such as the logical partitions 403-405. For example, first hardware I/O adapter 410 may be a single root I/O virtualized (SR-IOV) adapter or a multiple root I/O virtualized (MR-IVO) adapter. The first hardware I/O adapter 410 may include multiple ports connecting to external IO devices, such as a first port 424 and a second port 425. Each of the ports 424-425 may be identified by a particular port identifier. For example, a port identifier 444 may identify the first port 424 and a port identifier 445 may identify the second port 425. The first slot 421 may be identified using a first slot identifier 441. The first slot identifier 441 may include a first root complex identifier 451 that is associated with the first root complex 407 and a first slot number 454 that is associated with the first slot 421. Thus, the first slot identifier 441 may identify that the first slot 421 is a particular slot (e.g., identified by the first slot number 454) that is coupled to a particular root complex (e.g., the first root complex 407).

The second root complex 408 may be coupled to a second slot 422. The second slot 422 may be identified via a second slot identifier 442. The second slot identifier 442 may include a second root complex identifier 452 that is associated with the second root complex 408 and a second slot number 455 that is associated with the second slot 422. Thus, the second slot identifier 442 may identify a particular slot number (e.g., the second slot number 455) that is associated with the second root complex 408.

The third root complex 409 may be coupled to a third slot 423. The third slot 423 may be identified by a third slot identifier 443. A second hardware I/O adapter 411 may be placed in the third slot 423. The second hardware I/O adapter 411 may be an SR-IOV or an MR-IOV adapter that is capable of hosting multiple virtual functions and providing the multiple virtual functions to the logical partitions 403-405. The second hardware I/O adapter 411 may include multiple ports, such as a first port 426 and a second port 427. Each of the ports 426-427 may be identified by a particular port identifier. For example, a port identifier 448 may identify the first port 426 and a port identifier 449 may identify the second port 427. The third slot 423 may be identified using a third slot identifier 443. The third slot identifier 443 may include a third root complex identifier 453 that is associated with the third root complex 409 and a third slot number 456 that is associated with the third slot 423. Thus, the third slot identifier 443 may identify a particular slot number (e.g., the third slot number 455) that is associated with the third root complex 409.

The memory 406 may include multiple tables, such as a first table 462, a second table 463, and a group-slot table 460. The first table 462 may include data entries corresponding to virtual functions that are hosted by the first hardware I/O adapter 410. The second table 463 may include data entries corresponding to virtual functions that are hosted by the second hardware I/O adapter 411. The group-slot table 460 may enable the hypervisor 402 to associate a group identifier with a particular slot identifier.

In operation, the first hardware I/O adapter 410 may be placed into the first slot 421 that is coupled to the first root complex 407. A system administrator may use a hardware management console (e.g., the hardware management console 316 of FIG. 3) to instruct the hypervisor 402 to perform various actions. For example, the hardware management console may be used to instruct the hypervisor 402 to configure the first hardware I/O adapter 410 to provide multiple virtual functions, such as virtual functions 430, 431, 432, and 433. The hardware management console may be used to instruct the hypervisor 402 to assign one or more of the virtual functions 430-433 to one or more of the logical partitions 403-405.

After the first hardware I/O adapter 410 has been placed in the first slot 421, the hypervisor 402 may identify the first hardware I/O adapter 410 and determine that the first hardware I/O adapter 410 is located in the first slot 421. In one embodiment, a hardware management console may send a message instructing the hypervisor 402 to power-up the first hardware I/O adapter 410 and configure the virtual functions 430-433. In another embodiment, the hypervisor 402 may identify the first hardware I/O adapter 410 during a discovery process or boot-up process.

The hypervisor 402 may determine that the first hardware I/O adapter 410 is capable of hosting multiple virtual functions, such as the virtual functions 430-433, in the first slot 421. The hypervisor 402 may group the virtual functions 430-433 into a first group 438. The hypervisor 402 may select a group identifier, such as a first group identifier 471, to identify the first group 438. The first group identifier 471 may be a group identifier that is un-associated with any of the slots 421-423. The hypervisor 402 may associate the first group identifier 471 with the first slot identifier 441 of the first slot 421. The hypervisor 402 may create an entry in the group-slot table 460 that associates the first group identifier 471 with the first slot identifier 441. The hypervisor 402 may use the group-slot table 460 to determine that the first group 438 is associated with the first hardware I/O adapter 410 that is located in the first slot 421.

The hypervisor 402 may create a number of tokens, such as tokens 481, 482, 483, and 484, based on a capability of the first hardware I/O adapter 410. For example, the hypervisor 402 may determine a number of virtual functions that the first hardware I/O adapter 410 is capable of hosting in the first slot 421 and create the same number of tokens. Each token that is created by the hypervisor 402 may correspond to one of the virtual functions hosted by the first hardware I/O adapter 410. A particular token of the tokens 481-484 may include the first group identifier 471. The particular token may include a virtual function identifier (e.g., one of the virtual function identifiers 340-345 of FIG. 3) that is associated with the corresponding virtual function. For example, the hypervisor 402 may create the first token 481 that corresponds to the first virtual function 430, the second token 482 that corresponds to the virtual function 431, the third token 483 that corresponds to the virtual function 432 and the fourth token 484 that corresponds to the virtual function 433. Each of the tokens 481-484 may include the first group identifier 471. The first token 481 may include a virtual function identifier associated with the virtual function 430. The second token 482 may include a virtual function identifier associated with the virtual function 431. The third token 483 may include a virtual function identifier associated with the virtual function 432. The fourth token 484 may include a virtual function identifier associated with the virtual function 433. Thus, each of the tokens 481-484 may uniquely identify one of the virtual functions 430-433 in the first group 438. The hypervisor 402 may provide one of the tokens 481-484 to one of the logical partitions 403-405 to enable the logical partition to access the associated virtual function.

The hypervisor 402 may identify the second hardware I/O adapter 411 in the third slot 423. The hypervisor 402 may determine that the second hardware I/O adapter 411 is capable of hosting multiple virtual functions in the third slot 423. The hypervisor 402 may select a second identifier 472 and associate the second group identifier 472 with the third slot identifier 443 by creating an entry in the group-slot table 460. The hypervisor 402 may create tokens that correspond to the virtual functions that may be hosted by the second hardware I/O adapter 411. For example, the second hardware I/O adapter 411 may host a virtual function 434, a virtual function 435, a virtual function 436 and a virtual function 437. The virtual functions 434-437 may be grouped together in a second group 439. The hypervisor 402 may create a token for each of the virtual functions that the second hardware I/O adapter 411 is capable of hosting. For example, the hypervisor 402 may create a fifth token 491 corresponding to a virtual function 434, a sixth token 492 corresponding to the virtual function 435, a seventh token 493 corresponding to the virtual function 436 and an eighth token 494 corresponding to the virtual function 437. Each of the tokens 491-494 may include a second group identifier 472 that corresponds to the second group 439 of virtual functions that are hosted by the second hardware I/O adapter 411 in the third slot 423. Each of the tokens 491-494 may include a virtual functions identifier (e.g., one of the virtual functions identifiers 340-345 of FIG. 3). For example, the fifth token 491 may include the second group identifier 472 and a virtual function identifier associated with the virtual function 434. The sixth token 492 may include the second group identifier 472 and a virtual function identifier associated with the virtual function 435. The seventh token 493 may include the second group identifier 472 and a virtual function identifier associated with the virtual function 436. The eighth token 494 may include the group identifier 472 and a virtual function identifier associated with the virtual function 437.

Each of the virtual functions 430-437 may be configured using one of the tokens 481-484 and 491-494 and a particular port number. The port number may identify which of the ports 424-427 a particular virtual function may use to perform an I/O operation. In response to receiving a request from one of the logical partitions 403-405, the hypervisor 402 may provide a virtual function that is capable of using a particular port. Each of the virtual functions 430-437 may be configured using one of the tokens 481-484 and 491-494 and a port number of the hardware I/O adapter. For example, the virtual function 430 may be configured with the first token 481 and the first port identifier 444 of the first port 424.

The first token 481 may be associated with the first port identifier 444 in the first table 462. The virtual function 431 may be configured using the second token 482 and the first port identifier 444 to indicate that the virtual function 431 is capable of accessing the first port 424. The second token 482 may be associated with the first port identifier 444 in the first table 462. The virtual functions 432 may be configured using the third token 483 and the second port identifier 445 to indicate that the virtual function 332 is capable of accessing the second port 445 of the first hardware I/O adapter 410. The third token 482 may be associated with the second port identifier 445 in the first table 462. The virtual function 433 may be configured using the fourth token 484 and the second port identifier 445 to indicate that the virtual function 433 is capable of accessing the second port 425. The fourth token 484 may be associated with the second port identifier 445 in the first table 462. In this way, when a request for a virtual function that can access a particular port is received, the hypervisor 402 may identify the port (look up the port identifier of the requested port) and provide a token that corresponds to a virtual function at the first hardware I/O adapter 410 that is capable of accessing the requested port.

Each of the virtual functions 430-437 may be configured using a particular token and a particular port number by the hypervisor 402, a physical adjunct (e.g., the PF adjunct 220 of FIG. 2), a VF adjunct (e.g., one of the VF adjuncts 222-224 of FIG. 2), or any combination thereof. For example, the hypervisor 402 may send the particular token and the particular port number to a PF adjunct (e.g., the PF adjunct 220 of FIG. 2) and instruct the PF adjunct to configure a particular virtual function using the particular token and the particular port number.

Thus, the hypervisor 402 may identify a hardware I/O adapter (e.g., one of the hardware I/O adapters 410 and 411) in a first physical slot location (e.g., one of the slots 421-423). The hypervisor 402 may associate a group identifier (e.g., one of the group identifiers 471 and 472) with the first physical slot location of the hardware I/O adapter. The hypervisor 402 may create tokens (e.g., the tokens 481-484) that correspond to the virtual functions that the hardware I/O adapter is capable of hosting. Each token may include the group identifier. If the hardware I/O adapter is moved from the first physical slot location to a second physical slot location, the group identifier may be associated with the second physical slot location of the hardware I/O adapter to enable the hardware I/O adapter to be configured to provide the virtual functions. The time to configure the hardware I/O adapter to provide the virtual functions may be reduced because the previously created tokens may be reused (e.g., rather than creating new tokens) after the hardware I/O adapter is moved to the second physical slot location.

Prior to moving the first hardware I/O adapter 410 from the first slot 421, the hypervisor 402 may receive a shutdown message from the hardware management console (e.g., the hardware management console 316 of FIG. 3) to initiate a shutdown process (e.g., a power down process) of the first hardware I/O adapter 410 within the first slot 421. The hypervisor 402 during the shutdown process of the first hardware I/O adapter 410 in the first physical slot location, the hypervisor 402 may deactivate the virtual functions 430-433 that are in the first group 438.

Figure 5:
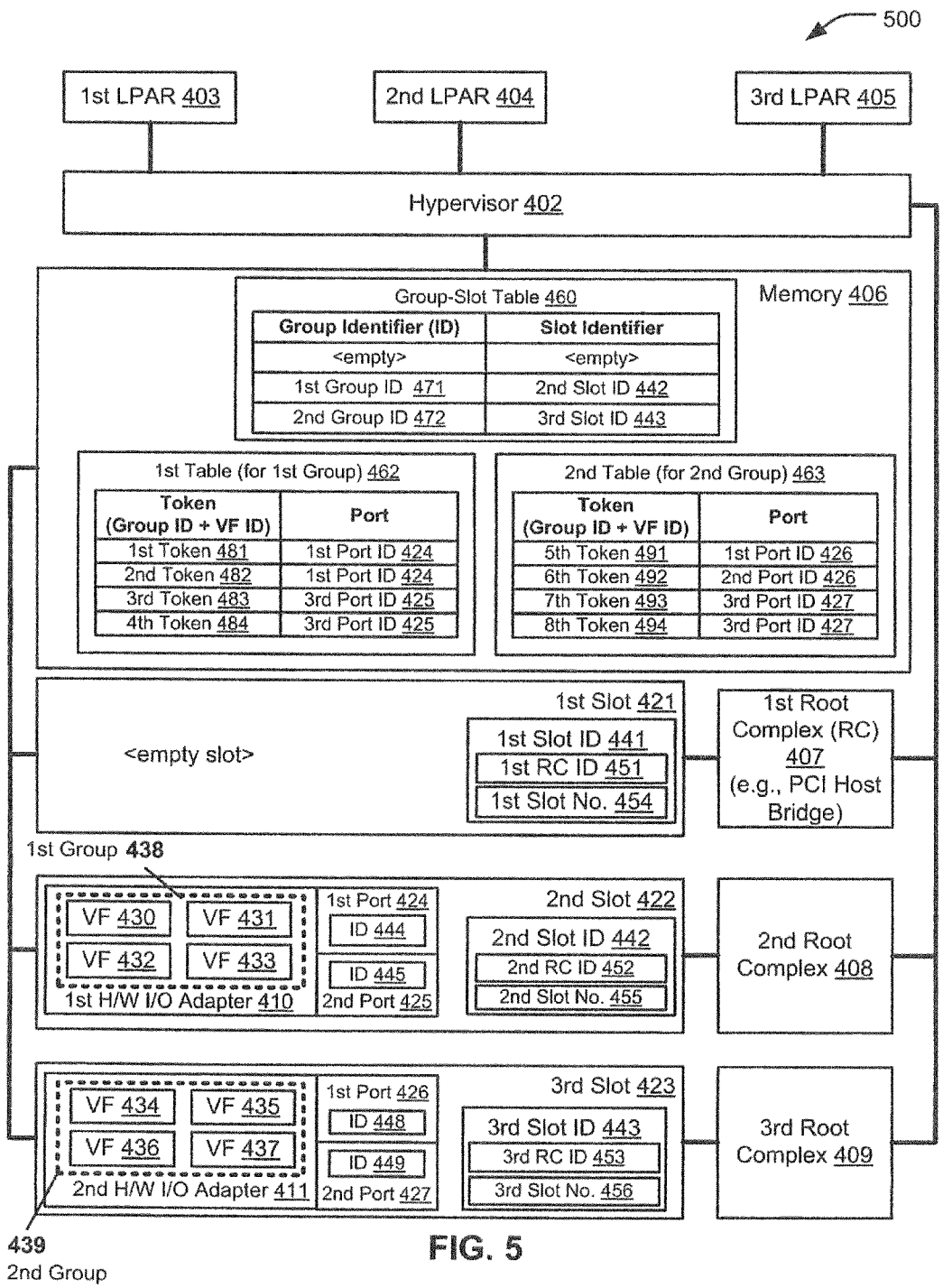
FIG. 5 is a block diagram of a fifth embodiment of a system to provide virtual functions that are hosted by an input/output adapter.

Referring to FIG. 5, a block diagram of a fifth embodiment of a system to provide virtual functions that are hosted by an input/output (I/O) adapter is depicted and generally designated 500. The system 500 may illustrate changes to the system of FIG. 4 after the first hardware I/O adapter 410 has been moved from the first slot 421 to the second slot 422.

The hypervisor 402 may determine that the first hardware I/O adapter 410 is located in the second slot 422. In one embodiment, a hardware management console (e.g., the hardware management console 316 of FIG. 3) may instruct the hypervisor 402 to power-up the first hardware I/O adapter 410 in the second slot 422. In another embodiment, the hypervisor 402 may identify the first hardware I/O adapter 410 during a discovery process or boot-up process.

The hypervisor 402 may associate the first group 438 of virtual functions 430-433 that are hosted by the first hardware I/O adapter 410 with the second slot 422 of the first hardware I/O adapter 410. For example, the hypervisor 402 may associate the first group 438 with the second slot 422 by creating (or modifying) an entry in the group-slot table 460 and associating the first group identifier 471 with the second slot identifier 442. The hypervisor 402 may configure the first group 438 of virtual functions 430-433 that are accessed via the tokens 481-484. For example, the hypervisor 402 may determine that the first hardware I/O adapter hosts the first group 438 that is associated with the first group identifier 471. The hypervisor 402 may identify the tokens 481-484 that include the group identifier 471. The hypervisor 402 may reconfigure the virtual functions 430-433 after the first hardware I/O adapter 410 has been moved to the second slot 422.

The number of virtual functions that the first hardware I/O adapter 410 is capable of hosting may be determined based on a combination of a capability of the first hardware I/O adapter 410 and a capability of the slot into which the first hardware I/O adapter 410 is placed. For example, the first hardware I/O adapter 410 may be moved from the first slot 421 to the second slot 422 because the second slot 422 has more data lanes. To illustrate, the second slot 422 may be capable of providing more bandwidth to the first hardware I/O adapter 410 to support additional virtual functions as compared to the first slot 421. The virtual functions 430-433 may be reconfigured after the first hardware I/O adapter 410 is moved to the second slot 422 because the number of virtual functions that the first hardware I/O adapter 410 is capable of hosting in the second slot 422 may be different from the number of virtual functions that the first hardware I/O adapter 410 is capable of hosting in the first slot 421.

By abstracting the slot identifier using the group identifier and associating a particular group identifier with each slot identifier, the virtual functions of a particular hardware I/O adapter, such as the first hardware I/O adapter 410, may be quickly reconfigured after the hardware I/O adapter is moved from one location to another location.

Thus, if the first hardware I/O adapter 410 is moved from the first slot 421 to the second slot 422, the first group identifier 471 may be associated with the second slot 422 to enable the first hardware I/O adapter 410 to be configured to provide the virtual functions 430-433. After the first hardware I/O adapter 410 is moved, the time to configure the first hardware I/O adapter 410 to provide the virtual functions 433 may be reduced because the previously created tokens may be reused (e.g., rather than creating new tokens) by associating the first group identifier 471 with the second slot identifier 442.

Figure 6:
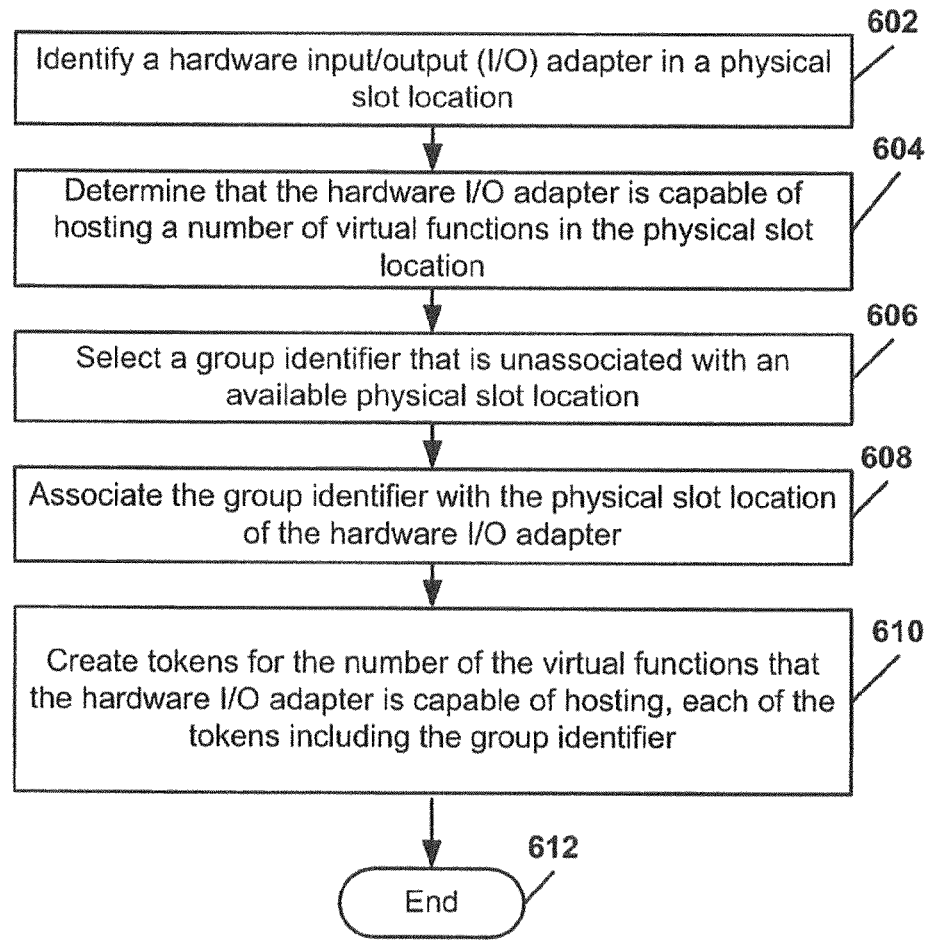
FIG. 6 is a flow diagram of a first method to provide virtual functions that are hosted by an input/output adapter.

Referring to FIG. 6, a flow diagram of a first method to provide virtual functions that are hosted by an input/output (I/O) adapter is depicted. The first method may be performed by a hypervisor (e.g., the hypervisor 110 of FIG. 1, the hypervisor 202 of FIG. 2, the hypervisor 302 of FIG. 3, and the hypervisor 402 of FIG. 4 and FIG. 5), by an adjunct (e.g., the PF adjunct 220), or any combination thereof.

A hardware I/O adapter may be identified in a physical slot location, at 602. Continuing to 604, a determination may be made that the hardware I/O adapter is capable of hosting a number of virtual functions in the physical slot location. For example, in FIG. 4, the hypervisor 402 may identify the first hardware I/O adapter 410 in the first slot 421. The hypervisor 402 may determine that the first hardware I/O adapter 410 is capable of hosting a number of virtual functions in the first slot 421. For example, the hypervisor 402 may determine that the first hardware I/O adapter 410 is capable of hosting the virtual functions 430-433.

Continuing to 606, a group identifier that is un-associated with an available physical slot location may be selected. Continuing to 608, the group identifier may be associated with the physical slot location of the hardware I/O adapter. Advancing to 610, tokens may be created for the number of virtual functions that the hardware I/O adapter is capable of hosting. Each of the tokens may include the group identifier. For example, in FIG. 4, the hypervisor 402 may select the first group identifier 471 and associate the first group identifier 471 with the first slot 421 of the first hardware I/O adapter 410. The hypervisor 402 may create the tokens 481-484 that correspond to each of the virtual functions 430-433 that the first hardware I/O adapter 410 is capable of hosting. Each of the tokens 481-484 may include the first group identifier 471 and a virtual function identifier that identifies the particular virtual function.

Thus, a group identifier may be associated with a group of virtual functions that are hosted by a hardware I/O adapter. Tokens may be created to access the virtual functions. Each token may include the group identifier and a virtual function identifier that identifies a particular virtual function of the group of virtual functions. The tokens may be sent by the hypervisor to an adjunct (e.g., the PF adjunct 220 of FIG. 2) to enable the adjunct to configure virtual functions and associate the configured virtual functions with the tokens.

Figure 7:
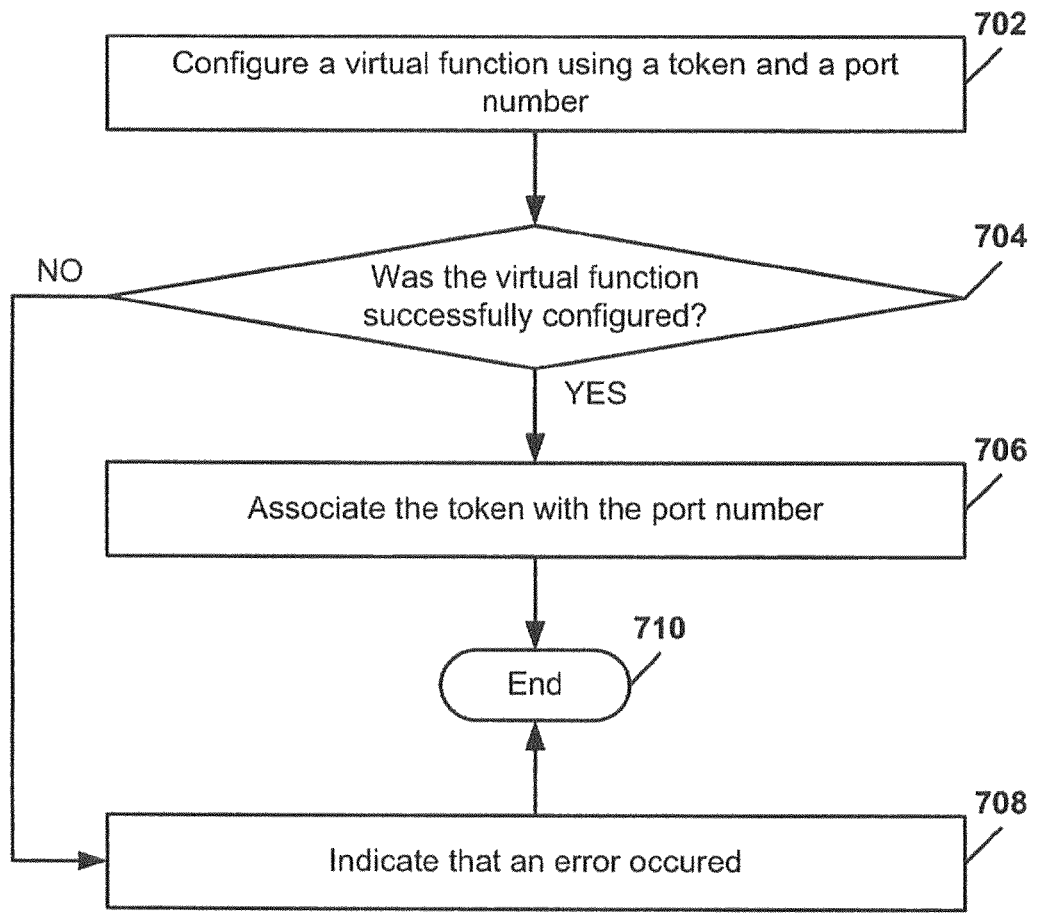
FIG. 7 is a flow diagram of a second method to provide virtual functions that are hosted by an input/output adapter.

Referring to FIG. 7, a flow diagram of a second method to provide virtual functions that are hosted by an input/output adapter is depicted. The second method may be performed by a hypervisor (e.g., the hypervisor 110 of FIG. 1, the hypervisor 202 of FIG. 2, the hypervisor 302 of FIG. 3, and the hypervisor 402 of FIG. 4 and FIG. 5), by an adjunct (e.g., the PF adjunct 220), or any combination thereof.

A virtual function is configured using a token and a port number at 702. For example, a hypervisor may instruct an adjunct (e.g., the PF adjunct 220 of FIG. 2) to configure the virtual function. The hypervisor may provide the token and the port number. Continuing to 704, a determination may be made whether the virtual function was successfully configured. When the determination at 704 is that the virtual function was successfully configured, the method may proceed to 706, where the token may be associated with the port number. The method may end at 710. For example, in FIG. 4, the hypervisor 402 may instruct an adjunct to configure the virtual functions 430-433. The hypervisor 402 may provide the tokens 481-484 and the port identifiers 444-445 to the adjunct. For example, the adjunct may configure a particular virtual function to use a particular port of a hardware I/O adapter and associate the configured virtual function with the token.

If a determination is made at 704 that the virtual function was not successfully configured, the method may proceed to 708 where an indication that an error occurred may be provided. The method may end, at 710.

Figure 8:
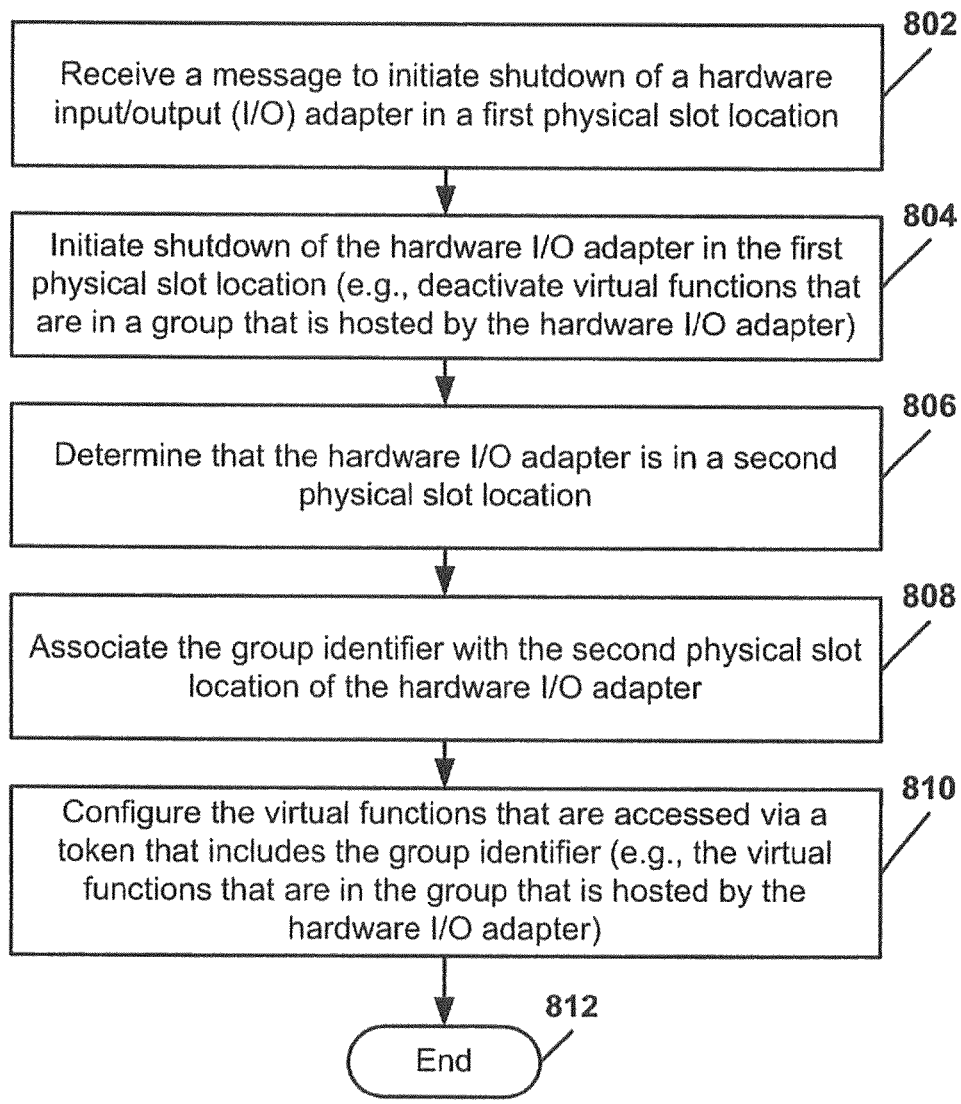
FIG. 8 is a flow diagram of a third method to provide virtual functions that are hosted by an input/output adapter.

Referring to FIG. 8, a flow diagram of a third method to provide virtual functions that are hosted by an input/output (I/O) adapter is depicted. The second method may be performed by a hypervisor (e.g., the hypervisor 110 of FIG. 1, the hypervisor 202 of FIG. 2, the hypervisor 302 of FIG. 3, and the hypervisor 402 of FIG. 4 and FIG. 5), by an adjunct (e.g., the PF adjunct 220), or any combination thereof.

A message to initiate shutdown of a hardware I/O adapter in a first physical slot location may be received. For example, the message may be received from a hardware management console, such as the hardware management console 316 of FIG. 3. Moving to 804, in response to receiving the message, a shutdown of the hardware I/O adapter may be initiated. For example, in FIG. 4, the virtual functions 430-433 that are hosted by the first hardware I/O adapter 410 may be deactivated in response to receiving a request to initiate shutdown of the first hardware I/O adapter 410.

Moving to 806, a determination may be made that the hardware I/O adapter is in a second physical slot location. For example, in FIG. 5, the hypervisor 402 may be instructed by a message received from a hardware management console to power-up the first hardware I/O adapter 410 in the second slot 422. As another example, the hypervisor 402 may identify the first hardware I/O adapter 410 in the second slot 422 during a discovery process.

Advancing to 808, the hypervisor 402 may associate the group identifier with the second physical slot location of the hardware I/O adapter. Continuing to 810, the virtual functions that are accessed via the token that includes the group identifier may be configured. For example, the hypervisor 402 may identify the tokens 481-484 that include the first group identifier 471 and configure the corresponding virtual functions 430-433.

Thus, a group identifier may be associated with a group of virtual functions that are hosted by a hardware I/O adapter. The group identifier may be associated with a first location of the hardware I/O adapter. A token may be created for each virtual function. The token may be associated with a particular virtual function. The token may include the group identifier and a virtual function identifier that is associated with the particular virtual function. The tokens may be provided to logical partitions to enable the logical partitions to perform I/O operations.

After the hardware I/O adapter is moved from the first location to a second location, the group identifier may be associated with the second location. The virtual functions that are hosted by the hardware I/O adapter may be accessed via the tokens, e.g., new tokens are not created for the virtual functions after the move.

Figure 9:
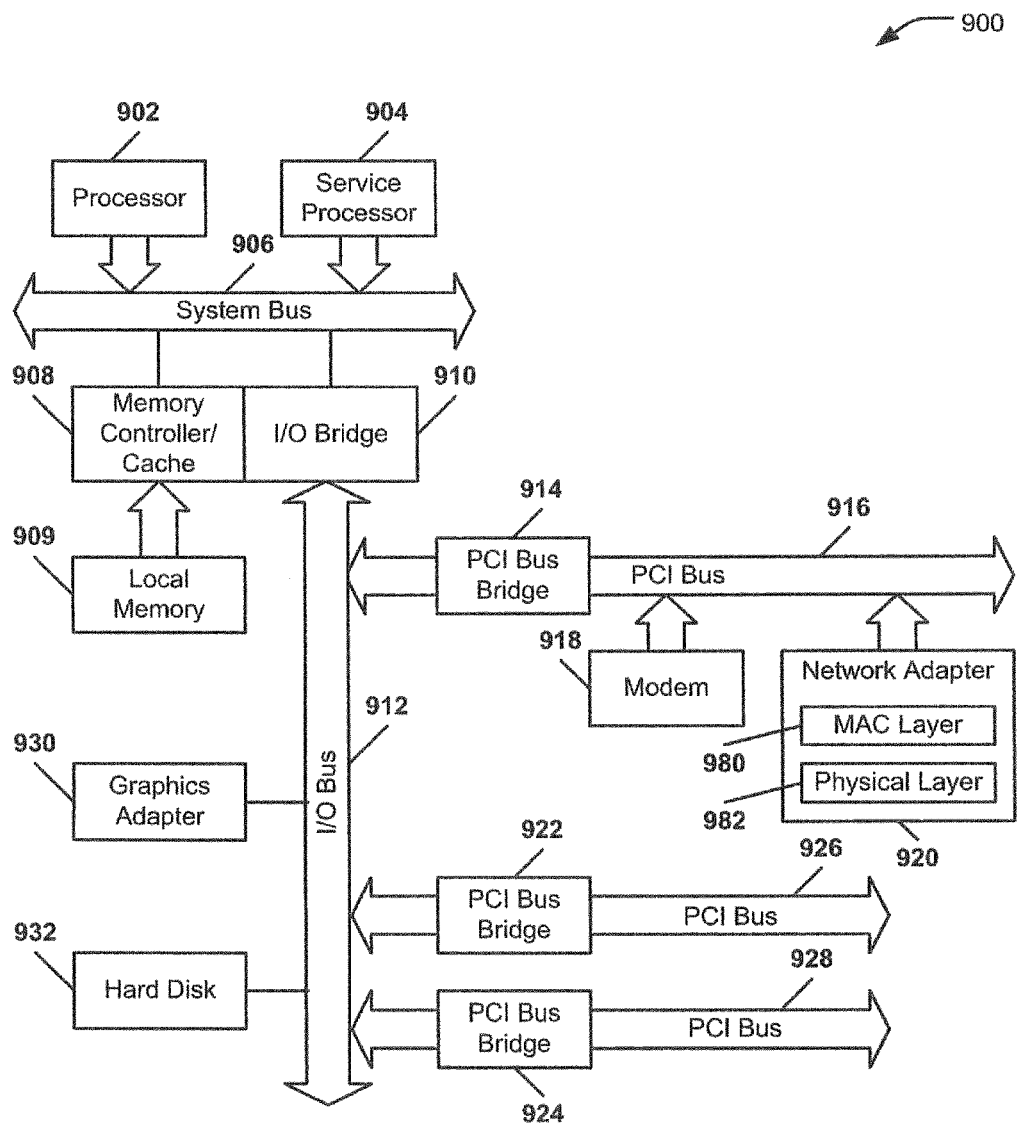
FIG. 9 is a block diagram of an illustrative embodiment of a general computer system.

Referring to FIG. 9, a block diagram of an illustrative embodiment of a general computer system is depicted and generally designated 900. The data processing system 900 may be a symmetric multiprocessor (SMP) system that includes a plurality of shared processors or SMT-capable processors, such as processors 902 and 904 connected to system bus 906. Alternatively, a single processor system may be employed. In the depicted example, processor 904 may be a service processor. Each SMT-capable processor may be capable of concurrently executing multiple hardware threads on the one processor.

Connected to system bus 906 may be memory controller/cache 908, which provides an interface to local memory 909. An I/O bus bridge 910 may be connected to a system bus 906 to provide an interface to I/O bus 912. A memory controller/cache 908 and an I/O bus bridge 910 may be integrated as depicted.

A peripheral component interconnect (PCI) bus bridge 914 connected to I/O bus 912 may provide an interface to PCI local bus 916. In FIG. 9, the term PCI in this application may also refer to variations and extensions of PCI, such as PCI express (PCIe). Multiple modems may be connected to PCI bus 916. Typical PCI bus implementations may support PCI expansion slots or add-in connectors. Communications links to network computers may be provided via modem 918 and network adapter 920 connected to PCI local bus 916 through add-in boards.

Network adapter 920 may include a physical layer 982 which enables analog signals to go out to a network, such as for example, an Ethernet network via an R45 connector. A media access controller (MAC) 980 may be included within network adapter 920. Media access controller (MAC) 980 may be coupled to bus 916 and processes digital network signals. MAC 980 may serve as an interface between bus 916 and physical layer 982. MAC 980 may perform a number of functions involved in the transmission and reception of data packets. For example, during the transmission of data, MAC 980 may assemble the data to be transmitted into a packet that includes address and error detection fields. During the reception of a packet, MAC 980 may disassemble the packet and perform address checking and error detection. In addition, MAC 980 may perform encoding/decoding of digital signals prior to transmission, perform preamble generation/removal, and bit transmission/reception.

Additional PCI bus bridges 922 and 924 may provide interfaces for additional PCI buses 926 and 928, from which additional modems or network adapters may be supported. In this manner, data processing system 900 may allow connections to multiple network computers. A memory-mapped graphics adapter 930 and hard disk 932 may be directly or indirectly connected to I/O bus 912.

Service processor 904 may interrogate system processors, memory components, and I/O bridges to generate and inventory the system 900. Service processor 904 may execute Built-In-Self-Tests (BISTs), Basic Assurance Tests (BATs), and memory tests on one or more of the elements in the system 900. Any error information for failures detected during the BISTs, BATs, and memory tests may be gathered and reported by service processor 904.

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain or store the program for use by or in connection with the instruction execution system, apparatus, or device.

In various embodiments, the medium may include an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, or virtualized within a single operating system for use within that or other operating systems, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A computer implemented method, comprising:
identifying a hardware input/output adapter in a first physical slot location;
determining that the hardware input/output adapter is capable of hosting a plurality of virtual functions in the first physical slot location;
selecting a group identifier that is unassociated with another physical slot location, wherein the group identifier represents the plurality of virtual functions that the hardware input/output adapter is capable of hosting;
associating the group identifier with the first physical slot location;
creating a plurality of tokens for each of the plurality of virtual functions that the hardware input/output adapter is capable of hosting, wherein each token includes the group identifier; and
associating each token of the plurality tokens with each virtual function of the plurality of virtual functions.

2. The computer implemented method of claim 1, wherein each token includes a virtual function identifier of the associated virtual function.

3. The computer implemented method of claim 1, further comprising sending the plurality of tokens to an adjunct to enable the adjunct to configure the virtual functions associated with the plurality of tokens.

4. The computer implemented method of claim 1, further comprising configuring a particular virtual function of the plurality of virtual functions based on the token associated with the particular virtual function and based on a port identifier that identifies a port of the hardware input/output adapter.

5. The computer implemented method of claim 1, further comprising initiating a shutdown process of the hardware input/output adapter in the first physical slot location in response to receiving an adapter shutdown message.

6. The computer implemented method of claim 5, further comprising:
determining the group identifier that is associated with the first physical slot location;
identifying one or more of the plurality of tokens that include the group identifier; and
deactivating one or more of the plurality of virtual functions that are associated with the one or more of the plurality of tokens.

7. The computer implemented method of claim 6, further comprising:
determining the group identifier that is associated with the first physical slot location;
identifying one or more tokens of the plurality of tokens that include the group identifier;
identifying at least one virtual function of the plurality of virtual functions that is associated with the one or more of the plurality of tokens; and
deactivating the at least one virtual function.

8. The computer implemented method of claim 7, further comprising:
determining that the hardware input/output adapter is in a second physical slot location;
associating the group identifier with the second physical slot location; and
configuring the at least one virtual function that is hosted by the hardware input/output adapter.

9. An apparatus, comprising:
a processor;
a memory to store program code, the program code executable by the processor to identify a hardware input/output adapter in a first physical slot location, to determine that the hardware input/output adapter is capable of hosting a plurality of virtual functions in the first physical slot location, to select a group identifier that is unassociated with another physical slot location, wherein the group identifier represents the plurality of virtual functions that the hardware input/output adapter is capable of hosting, to associate the group identifier with the first physical slot location; to create a plurality of tokens for each of the plurality of virtual functions that the hardware input/output adapter is capable of hosting, wherein each token includes the group identifier, and to associate each token of the plurality of tokens with each virtual function of the plurality of virtual functions.

10. The apparatus of claim 9, wherein the apparatus comprises a single root input/output virtualized (SR-IOV) adapter.

11. The apparatus of claim 9, wherein the program code is further executable by the processor to initiate a shutdown process of the hardware input/output adapter in the first physical slot location in response to receiving an adapter shutdown message.

12. The apparatus of claim 11, wherein the program code is further executable by the processor to determine the group identifier that is associated with the first physical slot location, to identify the plurality of tokens that include the group identifier, and to deactivate the plurality of virtual functions that are associated with the plurality of tokens.

13. The apparatus of claim 12, wherein the program code is further executable by the processor to determine that the hardware input/output adapter is in a second physical slot location, to associate the group identifier with the second physical slot location.

14. The apparatus of claim 13, wherein the program code is further executable by the processor to configure the hardware input/output adapter in the second physical slot location to host the plurality of virtual functions based on the token associated with the particular virtual function and based on a port identifier that identifies a port of the hardware input/output adapter in the second physical slot location.

15. The apparatus of claim 9, wherein each token includes a virtual function identifier of the associated virtual function.

16. The apparatus of claim 9, wherein the program code is further executable by the processor to send the plurality of tokens to an adjunct to enable the adjunct to configure the virtual functions associated with the plurality of tokens.

17. The apparatus of claim 9, wherein the program code is further executable by the processor to configure a particular virtual function of the plurality of virtual functions based on the token associated with the particular virtual function and based on a port identifier that identifies a port of the hardware input/output adapter.

18. A computer program product comprising a non-transitory computer usable medium having computer usable program code embodied therewith, the computer usable program code executable by a processor to:
identify a hardware input/output adapter in a first physical slot location;
determine that the hardware input/output adapter is capable of hosting a plurality of virtual functions in the first physical slot location;
select a group identifier that is unassociated with another physical slot location, wherein the group identifier represents the plurality of virtual functions that the hardware input/output adapter is capable of hosting;
associate the group identifier with the first physical slot location;
create a plurality of tokens for each of the plurality of virtual functions that the hardware input/output adapter is capable of hosting, wherein each token includes the group identifier; and
associate each token of the plurality of tokens with each virtual function of the plurality of virtual functions.

19. The computer program product of claim 18, wherein the computer usable program code is further executable by the processor to:
receive an adapter shutdown message;
initiate a shutdown process of the hardware input/output adapter that is located in the first physical slot location;
determine the group identifier that is associated with the first physical slot location;
identify the plurality of tokens that include the group identifier; and
deactivate the plurality of virtual functions that are associated with the plurality of tokens.

20. The computer program product of claim 19, wherein the computer usable program code is further executable by the processor to:
determine that the hardware input/output adapter is in a second physical slot location;
associate the group identifier with the second physical slot location; and
configure the plurality of virtual functions based on the token associated with the particular virtual function and based on a port identifier that identifies a port of the hardware input/output adapter in the second physical slot location.

* * * * *